United States Patent
Zheng et al.

(10) Patent No.: US 8,831,608 B2
(45) Date of Patent: Sep. 9, 2014

(54) APPARATUSES, SYSTEMS, AND METHODS FOR INBOUND HANDOVER ENHANCEMENT

(75) Inventors: Yan-Xiu Zheng, Zhudong Township, Hsinchu County (TW); Chun-Chia Chen, Zhutang Township, Changhua County (TW); Ming-Bing Chen, Taipei (TW); Hao-Wen Chen, legal representative, Taipei County (TW)

(73) Assignee: Acer Incorporated, Taipei Hsien (TW)

( * ) Notice: Subject to any disclaimer, the term of this patent is extended or adjusted under 35 U.S.C. 154(b) by 49 days.

(21) Appl. No.: 12/911,155

(22) Filed: Oct. 25, 2010

(65) Prior Publication Data
US 2012/0100851 A1 Apr. 26, 2012

(51) Int. Cl.
*H04W 36/00* (2009.01)
*H04W 36/04* (2009.01)
*H04W 84/04* (2009.01)

(52) U.S. Cl.
CPC .......... *H04W 36/0094* (2013.01); *H04W 36/04* (2013.01); *H04W 84/045* (2013.01)
USPC ........... 455/436; 455/424; 455/450; 455/444; 455/449; 370/462; 370/331

(58) Field of Classification Search
USPC ......................................... 455/424, 436–444
See application file for complete search history.

(56) References Cited

U.S. PATENT DOCUMENTS

| | | | |
|---|---|---|---|
| RE39,177 E * | 7/2006 | Padovani et al. | 455/442 |
| 2003/0189949 A1* | 10/2003 | Belaiche | 370/462 |
| 2008/0200177 A1* | 8/2008 | Wang et al. | 455/450 |
| 2009/0047960 A1* | 2/2009 | Gunnarsson et al. | 455/436 |
| 2009/0132674 A1* | 5/2009 | Horn et al. | 709/207 |
| 2009/0316654 A1* | 12/2009 | Prakash et al. | 370/331 |
| 2010/0093358 A1* | 4/2010 | Cheong et al. | 455/444 |
| 2010/0222062 A1* | 9/2010 | Chou et al. | 455/449 |
| 2010/0234016 A1* | 9/2010 | Palanki et al. | 455/424 |
| 2010/0304748 A1* | 12/2010 | Henttonen et al. | 455/436 |
| 2011/0300866 A1* | 12/2011 | Ali et al. | 455/436 |

FOREIGN PATENT DOCUMENTS

| | | |
|---|---|---|
| CN | 101772097 | 7/2010 |
| EP | 2 227 056 | 9/2010 |

OTHER PUBLICATIONS

Taiwanese language office action dated Sep. 24, 2013.
Chinese language office action dated Nov. 11, 2013.
English language translation of abstract of CN 101772097 (published Jul. 7, 2010).

* cited by examiner

*Primary Examiner* — Gerald Johnson
(74) *Attorney, Agent, or Firm* — McClure, Qualey & Rodack, LLP

(57) ABSTRACT

A wireless communications device with a wireless module and a controller module is provided. The wireless module performs wireless transmission and reception to and from a service network comprising at least two first home base stations having the same physical cell identity (PCI) or physical scrambling code (PSC), a plurality of second home base stations neighboring the first home base stations, and a macro base station. The controller module receives a message from the macro base station via the wireless module, requests the wireless module to detect a plurality of PCIs or PSCs respectively corresponding to the first home base stations and the second home base stations in response to the message, and transmits to the macro base station via the wireless module the detected PCIs or PSCs, prior to being handed over to the one of the first home base stations from the macro base station.

46 Claims, 14 Drawing Sheets

APPARATUSES, SYSTEMS, AND METHODS FOR INBOUND HANDOVER ENHANCEMENT

BACKGROUND OF THE INVENTION

1. Field of the Invention

The invention generally relates to handovers in wireless communication environments, and more particularly, to apparatuses, systems, and methods for enhancing inbound handovers when multiple home base stations having the same physical cell identity (PCI) or physical scrambling code (PSC) are disposed in the coverage of a macro base station.

2. Description of the Related Art

In a typical wireless communication network, the deployment of network nodes is generally planned by the operator beforehand. The network coverage is sometimes inevitably limited due to signal attenuation in structures, especially in indoor areas, such as home premises and office areas. A femtocell is a small cellular base station, typically designed for use in a home or small business, which enhances reception quality of a wireless communication network in indoor coverage. Since a femtocell features enhancing reception quality of macro cell, the coverage of a femtocell is small and a femtocell is generally in the coverage of macro cell to amend the coverage hole of macro cell. In a hybrid access network, the coverage of a macro base station may consist of a large number of femtocells. FIG. 1 illustrates the network topology of such a hybrid access network. For the third generation partnership project (3GPP) long term evolution (LTE) network, a femtocell may be referred to as a home evolved Node-B (or HeNB), and a macro base station may be referred to as a macro evolved Node-B (MeNB). Generally, each base station, including each HeNB and MeNB, broadcasts a specific synchronization code to allow the user equipments (UE) to synchronize with the timing of the suitable base stations. This specific synchronization code can be further used for cell identification, and the synchronization code for the use of cell identification is referred to as a PCI. By utilizing the PCI, a UE may rapidly report to eNB to which HeNB with better reception quality is suitable to camp on.

However, the number of the cell identifications is limited in a wireless communications network. For example, the maximum number of PCIs in an LTE network is 504. In a densely-deployed environment, such as metropolitan area, the number of HeNBs in the coverage of an MeNB may be larger than the maximum number of PCIs defined for the LTE networks, and so, it is very likely that multiple HeNBs located in the coverage of one MeNB would have the same PCI. When an MeNB requests a UE to report the detected cells, PCI confusion may occur, in which the MeNB may not be able to recognize which HeNB the UE reported. When the number of HeNBs grows in the coverage of an MeNB, the PCI confusion gets serious and further causes a major burden for the handovers from the MeNB to one of the HeNBs (usually referred to as inbound handovers), e.g. data forwarding to multiple candidate HeNBs to prevent handover failure. Thus, it is desirable to address the PCI confusion and provide inbound handovers with low complexity, e.g. reducing the number of candidate HeNB to one.

BRIEF SUMMARY OF THE INVENTION

Accordingly, embodiments of the invention provide apparatuses, systems, and methods for inbound handover enhancement. In one aspect of the invention, a wireless communications system comprising a wireless module and a controller module is provided. The wireless module performs wireless transmission and reception to and from a service network comprising at least two first home base stations having the same PCI or PSC, a plurality of second home base stations neighboring the first home base stations, and a macro base station, wherein the second home base stations neighboring one of the first home base stations and the second home base stations neighboring another one of the first home base stations are assigned with non-identical PCIs or PSCs. The controller module receives a message from the macro base station via the wireless module, and requests the wireless module to detect a plurality of PCIs or PSCs respectively corresponding to the first home base stations and the second home base stations in response to the message. Also, the controller module transmits the detected PCIs or PSCs to the macro base station via the wireless module, prior to being handed over to the one of the first home base stations from the macro base station.

In another aspect of the invention, a method for inbound handover enhancement is provided. The method is executed in a wireless communications device connecting to a service network comprising at least two first home base stations having the same PCI or PSC, a plurality of second home base stations neighboring the first home base stations, and a macro base station. The method comprises the steps of receiving from the macro base station a message, detecting a plurality of PCIs or PSCs respectively corresponding to the first home base stations and the second home base stations in response to the message, wherein the second home base stations neighboring one of the first home base stations and the second home base stations neighboring another one of the first home base stations are assigned with non-identical PCIs or PSCs, and transmitting the detected PCIs or PSCs to the macro base station, prior to being handed over to one of the first home base stations from the macro base station.

In another aspect of the invention, a macro base station comprising a wireless module and a controller module is provided. The wireless module receives wireless signals from a plurality of home base stations via a sounding channel, and a measurement report from a wireless communications device. The controller module determines a plurality of first arrival angles or first antenna sectors of the wireless signals, and determines a second arrival angle or a second antenna sector of the measurement report. Also, the macro base station hands over the wireless communications device to one of the base stations according to comparisons between the first arrival angles or the first antenna sectors and the second arrival angle or the second antenna sector.

In another aspect of the invention, a method for inbound handover enhancement executed in a macro base station is provided. The method comprises the steps of receiving wireless signals from a plurality of home base stations via a sounding channel, and a measurement report from a wireless communications device, determining a plurality of first arrival angles or first antenna sectors of the wireless signals, determining a second arrival angle or a second antenna sector of the measurement report, and handing over the wireless communications device to one of the base stations according to comparisons between the first arrival angles or the first antenna sectors and the second arrival angle or the second antenna sector.

In another aspect of the invention, a macro base station for inbound handover enhancement is provided. The macro base station comprises a wireless module and a controller module. The wireless module performs wireless transmissions and receptions from and to a plurality of home base stations and a wireless communications device. The controller module determines that more than one of the home base stations is corresponding to a PCI or PSC, and requests the home base stations corresponding to the PCI or PSC to measure wireless signals from the wireless communications device. Also, the controller module hands over the wireless communications device to one of the home base stations corresponding to the PCI or PSC according to the measured wireless signals.

In another aspect of the invention, a method for inbound handover enhancement is provided. The method is executed in a macro base station with a coverage over a plurality of home base stations. The method comprises the steps of determining that more than one of the home base stations is corresponding to a PCI or PSC, requesting the home base stations corresponding to the PCI or PSC to measure wireless signals from a wireless communications device, and handing over the wireless communications device to one of the home base stations corresponding to the PCI or PSC according to the measured wireless signals.

In another aspect of the invention, home base station for inbound handover enhancement is provided. The home base station comprises a wireless module and a controller module. The wireless module receives a request message from a macro base station, wherein the request message is transmitted in response to the macro base station determining that the home base station is corresponding to a PCI or PSC of another home base station. The controller module requests the wireless module to receive a wireless signal from a wireless communications device in response to the request message, and transmits a response message with information concerning the received wireless signal to the macro base station to assist on a handover of the wireless communications device from the macro base station to one of the home base stations corresponding to the PCI or PSC.

In another aspect of the invention, a method for inbound handover enhancement is provided. The method is executed in a home base station corresponding to a PCI or PSC of another home base station in a coverage of a macro base stations. The method comprises the steps of receiving a request message from the macro base station, wherein the request message is transmitted in response to the macro base station determining that the home base station is corresponding to a PCI or PSC of another home base station, receiving a wireless signal from a wireless communications device in response to the request message, and transmitting a response message with information concerning the received wireless signal to the macro base station to assist on a handover of the wireless communications device from the macro base station to one of the home base stations corresponding to the PCI or PSC.

In another aspect of the invention, a wireless communications system comprising a wireless module and a controller module is provided. The wireless module performs wireless transmission and reception to and from a service network comprising a macro base station and at least two home base stations corresponding to a PCI or PSC. The controller module transmits a random access request to the home base stations via the wireless module in response to receiving a measurement request from the macro base station, and receives a random access response with a cell global identity (CGI) from one of the home base stations.

In another aspect of the invention, a method for inbound handover enhancement is provided. The method is executed in a wireless communications device connecting to a service network comprising a macro base station and at least two home base stations corresponding to a PCI or PSC. The method comprises the steps of transmitting a random access request to the home base stations in response to receiving a measurement request from the macro base station, and receiving a random access response with a CGI from one of the home base stations.

Other aspects and features of the invention will become apparent to those with ordinary skill in the art upon review of the following descriptions of specific embodiments of the wireless communications devices, the service networks, and the methods for inbound handover enhancement.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
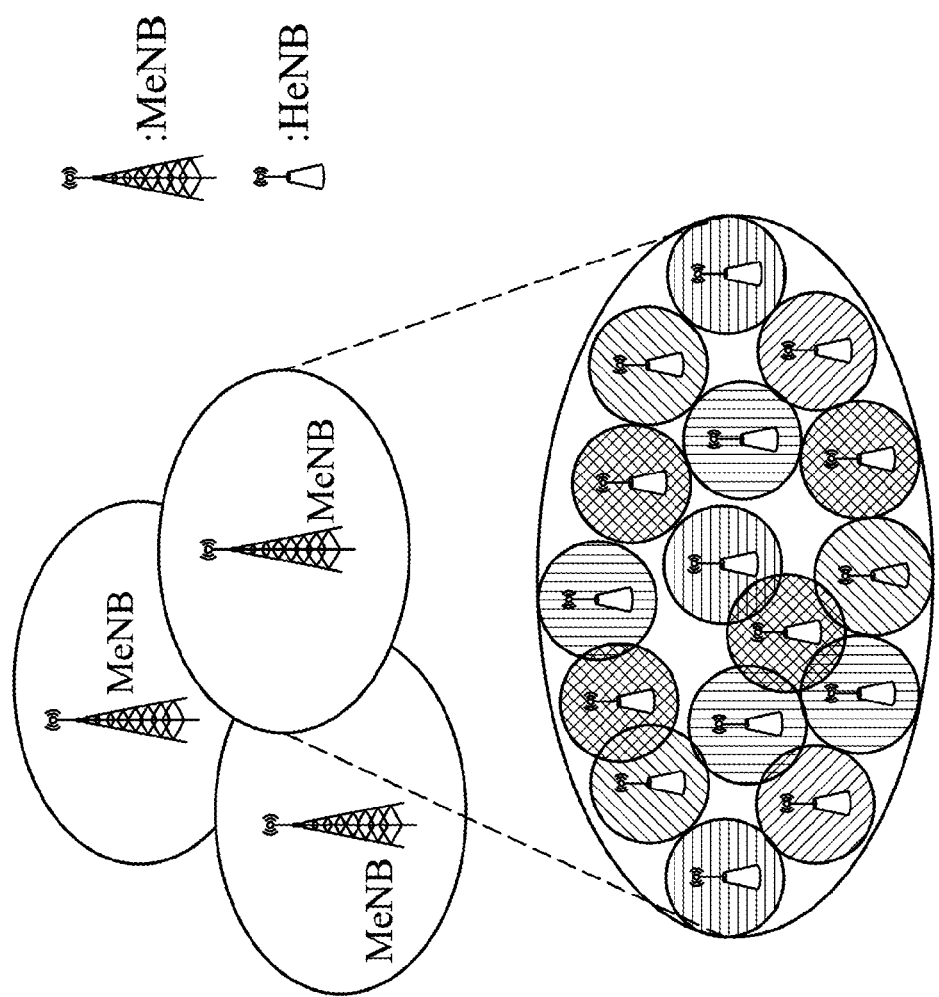
FIG. 1 is a schematic diagram illustrating the network topology of a hybrid access network.
Figure 2:
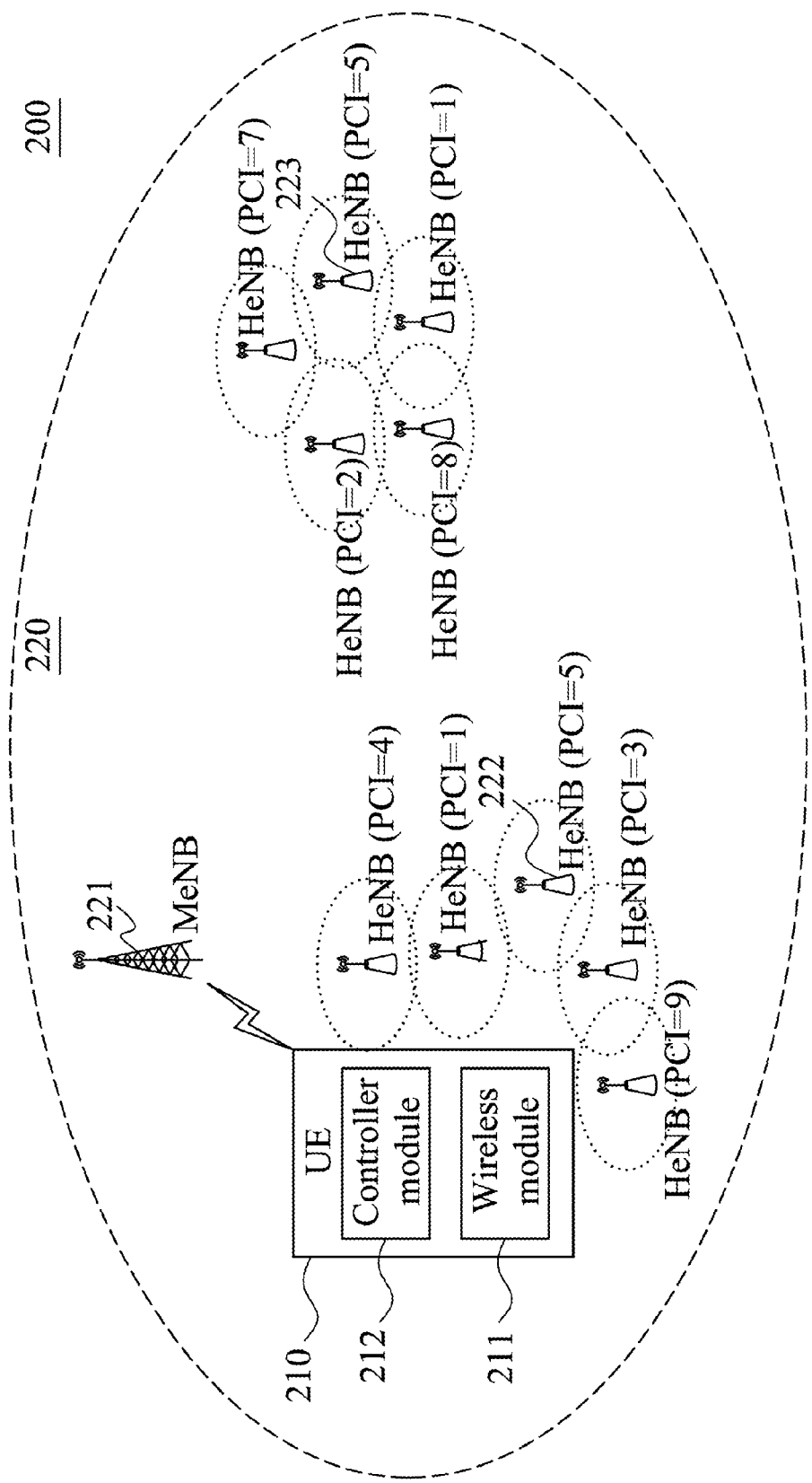
FIG. 2 is a block diagram illustrating a wireless communications system according to a UE assisted embodiment of the invention.

In order to resolve PCI confusion during inbound handovers, the invention proposes both UE assisted and network assisted embodiments to distinguish between different home base stations having the same PCI. FIG. 2 is a block diagram illustrating a wireless communications system according to a UE assisted embodiment of the invention. In the wireless communications system 200, a user equipment (UE) 210 is connected to a network 220 via an air interface, and performs wireless transmissions and receptions to and from the network 220. The network 220 comprises a macro evolved Node-B (MeNB) 221 and two home evolved Node-Bs (HeNB) 222 and 223, where the MeNB 221 refers to a macro base station and the HeNBs 222 and 223 refer to home base stations in the coverage of the MeNB 221. The HeNBs 222 and 223 both have the same PCI and are located within the coverage of the MeNB 221. The UE 210 comprises a wireless module 211 for performing the functionality of wireless transmissions and receptions. To further clarify, the wireless module 211 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, and convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system. Also, the UE 210 comprises a controller module 212 for controlling the operation of the wireless module 211 and other function components, such as a display unit and/or keypad serving as the MMI (man-machine interface), a storage unit storing the program codes of applications or communication protocols, or others. To be more specific, the controller module 212 controls the wireless module 211 to perform an improved inbound handover procedure.

The UE 210 is connected to the network 220 via the MeNB 221. The UE 210 receives a measurement request from the MeNB 221, in which PCIs of specific neighboring network nodes are indicated for performing measurements on the specific neighboring network nodes. The information regarding the requested specific neighboring network nodes in the measurement request may be provided by a Mobility Management Entity (MME) (not shown) of the service network 220. In this embodiment, a PCI of 5 is given in the measurement request indicating that measurement on the HeNB 222 is requested. In an LTE system, the measurement request may be implemented with a measurement configuration message which, when transmitted to the UE 210, triggers the measurements on specific neighboring network nodes. Note that although there are two HeNBs having the PCI of 5, i.e. the HeNB 222 and 223, the MeNB 221 may assign the neighboring network nodes of the HeNBs 222 and 223 with different PCIs. Specifically, the network operator may assign an appropriate PCI to a newly installed HeNB, so that the neighboring network nodes of the HeNBs with the same PCI may not have exactly identical PCIs. As shown in FIG. 2, the HeNBs 222 and 223 both have a PCI of 5, while the neighboring HeNBs of the HeNB 222 have PCIs of 1, 4, 9, and 3, and the neighboring HeNBs of the HeNB 223 have PCIs of 7, 2, 8, and 1. When the measurement request is received, the controller module 212 requests the wireless module 211 to detect the PCIs and signal strengths from not only the HeNB 222, but also the HeNBs neighboring the HeNB 222 (denoted with PCIs of 1, 4, 9, and 3). After the measurements are completed, the controller 212 transmits a measurement report with the detected signal strengths and PCIs of the measured HeNBs to the MeNB 221 via the wireless module 211. The controller 212 may further sort the measured HeNBs with detected signal strengths in an incremental or a decremental order. Based on the received measurement report, the MeNB 221 may distinguish between the HeNB 222 and the HeNB 223 even if the HeNB 222 and 223 have the same PCI. To further clarify, the MeNB 221 may distinguish between the HeNB 222 and the HeNB 223 because the neighboring HeNBs of the HeNBs 222 and 223 have different set of PCIs. Therefore, the MeNB 221 determines that the HeNB 222 may be the target HeNB as the detected signal strengths from the neighboring HeNBs of the HeNB 222 are stronger than that from the neighboring HeNBs of the HeNB 223 in the measurement report. After a handover request is transmitted to and acknowledged by the HeNB 222, the MeNB 221 transmits a radio resource control (RRC) reconfiguration message with information of the HeNB 222 to enable the inbound handover, and then transfers the control statuses and data for the UE 210 to the HeNB 222.

Figure 3A:
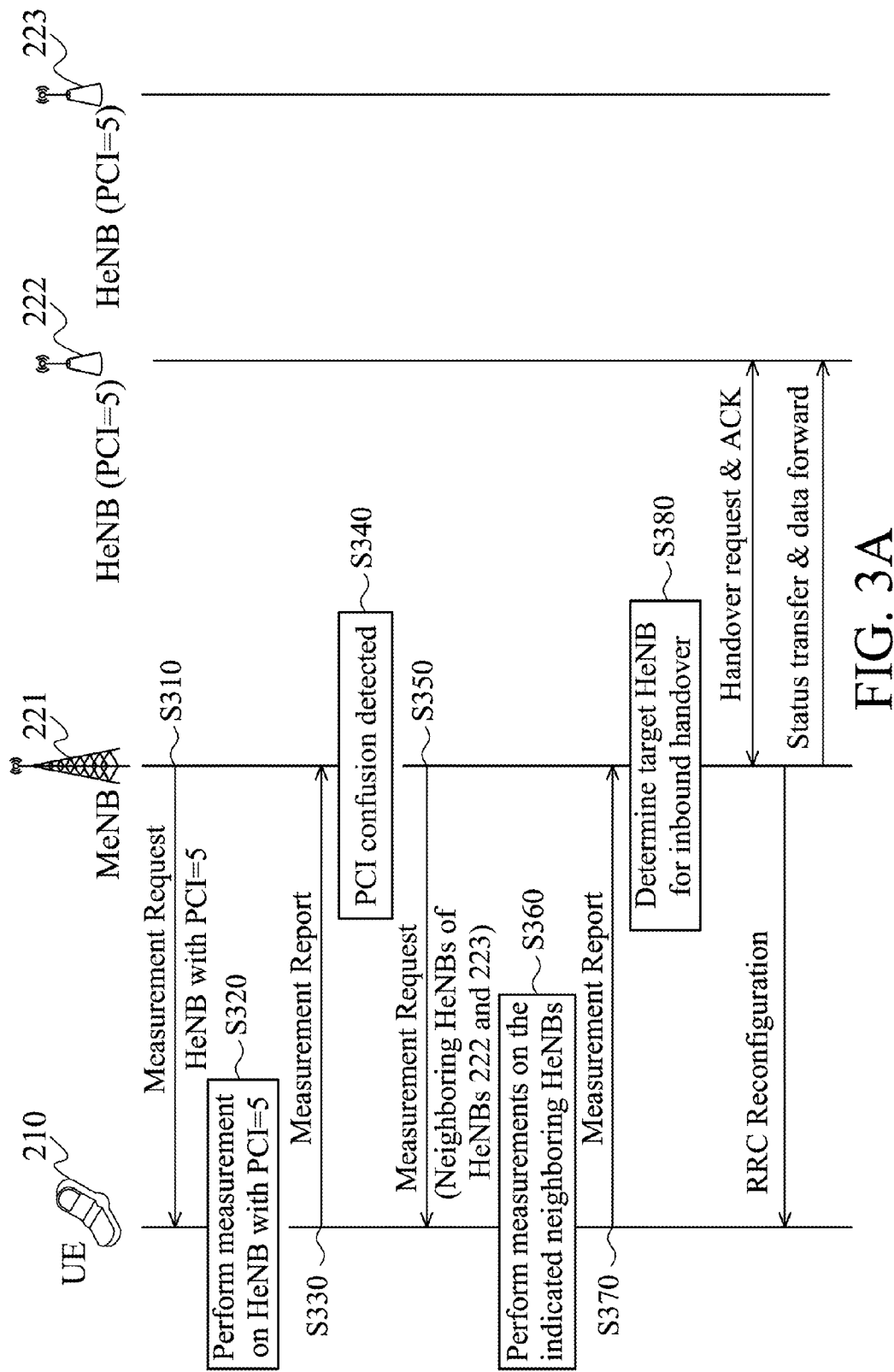
FIGS. 3A and 3B are message sequence charts illustrating operation alternatives for resolving PCI confusion according the wireless communications system in FIG. 2.
Figure 3B:
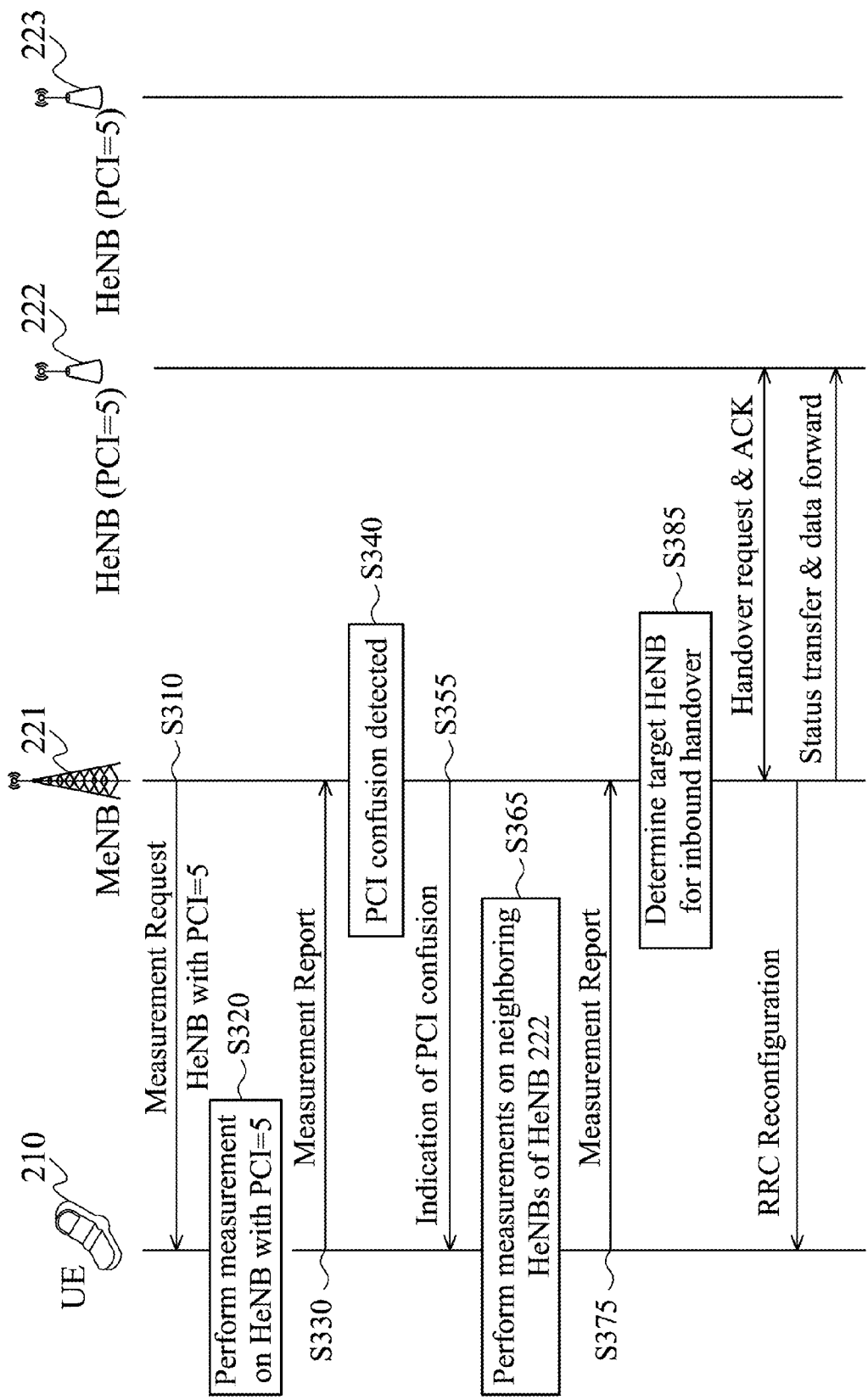

It is noted that the measurement process described above may be carried out differently. FIG. 3A is a message sequence chart illustrating an operation alternative for resolving PCI confusion according the wireless communications system in FIG. 2. When a measurement request is received from the MeNB 221 (step S310), the controller module 212 requests the wireless module 211 to detect the signal strength from the HeNB with PCI=5 (step S320). After the measurement is completed, the controller 212 transmits a measurement report with the detected signal strength and PCI of the measured HeNB to the MeNB 221 via the wireless module 211 (step S330). Since the HeNBs 222 and 223 both have the PCI of 5, a PCI confusion is detected (step S340). Subsequently, the MeNB 221 transmits another measurement request indicating that measurements on the neighboring HeNBs of the HeNBs 222 and 223 are requested (step S350), wherein the neighboring HeNBs of the HeNB 222 are not supposed to overlap with the neighboring HeNBs of the HeNB 223. Alternatively, the later measurement request may indicate that measurements on the neighboring HeNBs of either one of HeNBs 222 and 223 are requested. In response to the later measurement request, the controller module 212 requests the wireless module 211 to detect the PCIs and signal strengths from the neighboring HeNBs of the HeNBs 222 and 223 (step S360), and transmits another measurement report with the detected signal strengths and PCIs of the measured HeNB to the MeNB 221 via the wireless module 211 when the measurements are completed (step S370). Based on the later received measurement report, the MeNB 221 determines that the HeNB 222 may be the target HeNB (step S380) as the detected signal strengths from the neighboring HeNBs of the HeNB 222 are stronger than that from the neighboring HeNBs of the HeNB 223 in the measurement report, and proceeds with handing over the UE 210 to the HeNB 222. In another embodiment, the steps S350 to S370 may be repeated if the MeNB 221 still can not resolve the PCI confusion according to the later received measurement report in step S380. FIG. 3B is a message sequence chart illustrating another operation alternative for resolving PCI confusion according the wireless communications system in FIG. 2. Similar to FIG. 3A, the UE 210 performs a first measurement to detect the signal strength from the HeNB with PCI=5 when receiving a measurement request from the MeNB 221, and the MeNB 221 determines that a PCI confusion is occurred since the HeNBs 222 and 223 both have the PCI of 5 (step S310~S340). Subsequently, the MeNB 221 indicates to the UE 210 that a PCI confusion is occurred with respect to the most recently received measurement report (step S355). The indication of PCI confusion may be an RRC message or a Medium Access Control (MAC) layer indicator with information of the PCI confusion. In response to the indication, the UE 210 may autonomously perform measurements on the neighboring HeNBs of the HeNB 222. That is, the controller module 212 requests the wireless module 211 to detect the PCIs and signal strengths from any possible neighboring HeNBs of the HeNB 222 (step S365), and transmits another measurement report with the detected signal strengths and PCIs of the measured HeNB to the MeNB 221 via the wireless module 211 when the measurements are completed (step S375). Based on the later received measurement report, the MeNB 221 determines that the HeNB 222 may be the target HeNB according to the knowledge of the deployments of the neighboring network nodes of the HeNBs 222 and 223 (step S385), and proceeds with handing over the UE 210 to the HeNB 222. In another embodiment, the steps S355 to S375 may be repeated if the MeNB 221 still can not resolve the PCI confusion according to the later received measurement report in step S385.

Regarding the measurements on the neighboring HeNBs of the HeNBs 222 and 223, the MeNB 221 may indicate in the measurement request that measurements are requested to be performed only on specific neighboring HeNBs but not all neighboring HeNBs of the HeNBs 222 and 223. For example, with the knowledge of the deployments of the neighboring network nodes of the HeNBs 222 and 223, the MeNB 221 may request the UE 210 to measure the signal strengths from the HeNBs with PCIs of 2 and 3. Since the PCIs of 2 and 3 are unique in the PCIs of the neighboring network nodes of the HeNBs 222 and 223, respectively, the HeNB 222 may be unambiguously determined to be the target HeNB as the reported signal strength from the HeNB with the PCI of 3 is better than that from the HeNB with the PCI of 2. It is to be understood that the UE 210 and the network 220 are given as an example, and the invention is not limited thereto. The invention may also be applied to wireless communications devices and service networks which are in compliance with other wireless technologies, such as the Universal Terrestrial Radio Access Network (UTRAN), the Evolved Universal Terrestrial Radio Access Network (EUTRAN), and the Worldwide Interoperability for Microwave Access (WiMAX) radio access network, etc.

Figure 4:
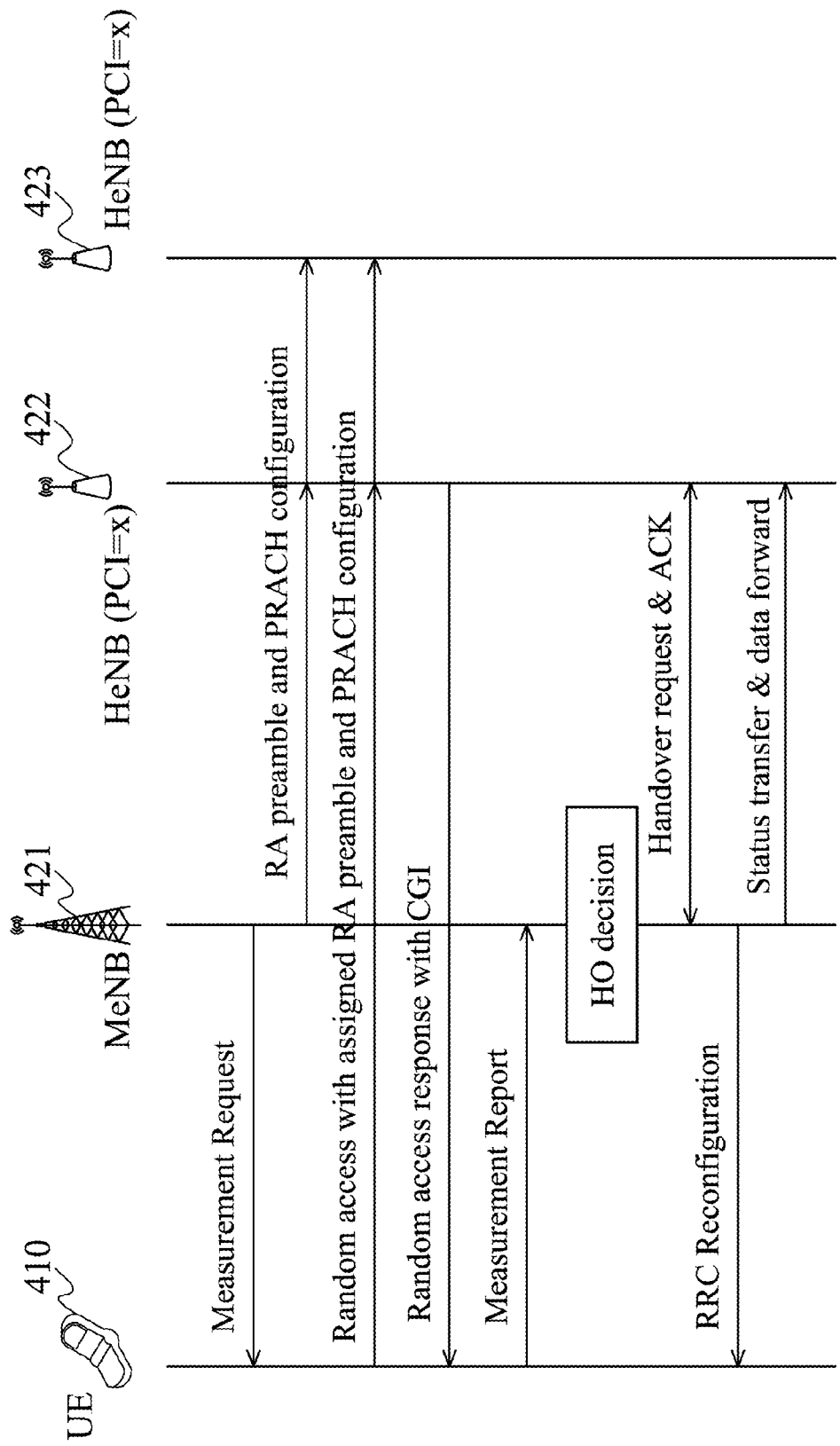
FIG. 4 is a message sequence chart illustrating a method for resolving PCI confusion according to another UE assisted embodiment of the invention.

FIG. 4 is a message sequence chart illustrating a method for resolving PCI confusion according to another UE assisted embodiment of the invention. The method is applied to a wireless communications system which comprises the UE 410 and the network 420. Similar to FIG. 2, the network 420 comprises an MeNB 421 and two HeNBs 422 and 423 having the same PCI. In this embodiment, a specific random access preamble and a corresponding physical random access channel (PRACH) configuration is reserved for the random access procedures later performed between the UE 410 and the HeNBs 422 and 423. After camping on the MeNB 421, the UE 410 receives a measurement request from the MeNB 421, in which the reserved random access preamble and PRACH configuration, along with PCIs of specific neighboring network nodes are indicated. Specifically, a PCI of 5 is given in the measurement request indicating that measurements on the HeNBs 422 and 423 are requested. In another embodiment, the MeNB 421 may transmit a measurement configuration message, instead of the measurement request, to the UE 410 to trigger the measurements on specific neighboring network nodes. After transmitting the measurement request, the MeNB 421 also indicates the reserved random access preamble and PRACH configuration to the HeNBs 422 and 423. When receiving the measurement request, the UE 410 transmits a random access request to the HeNBs 422 and 423 using the reserved random access preamble and PRACH configuration. Subsequently, the HeNB 422 replies with a random access response including its cell global identity (CGI) to the UE 410 in response to receiving the random access request from the UE 410, wherein the CGI is the concatenation of the Location Area Identity (LAI) and the Cell Identity (CI), and is used to uniquely identify a network node in a service network. Particularly, the HeNBs 422 and 423 use the reserved random access preamble and PRACH configuration to receive the random access request from the UE 410. Note that the HeNBs 422 and 423 are located far enough apart to avoid interferences caused to each other, so that the HeNB 423 does not receive the random access request from the UE 410. The UE 410 further measures the signal strength of the random access request and transmits a measurement report with the measured signal strength and the CGI to the MeNB 421. After that, the MeNB 421 makes a handover decision (denoted as HO decision) to determine that the HeNB 422 is the target HeNB for the UE 410 to be handed over to. After a handover request is transmitted to and acknowledged by the HeNB 422, the MeNB 421 transmits an RRC reconfiguration message with the information of the HeNB 422 to enable the inbound handover, and then transfers the control statuses and data for the UE 410 to the HeNB 422. In one embodiment, the HeNB 422 may further include a closed subscriber group identity (CSG ID) in the random access response, and the MeNB 421 may make the handover (HO) decision further according to the CSG ID. It is noted that the UE 410 may also comprise a wireless module (not shown) and a controller module (not shown), which are similar to FIG. 2, except that the controller module (not shown) is configured to control the wireless module (not shown) to perform the above described method for resolving PCI confusion in this embodiment.

Figure 5:
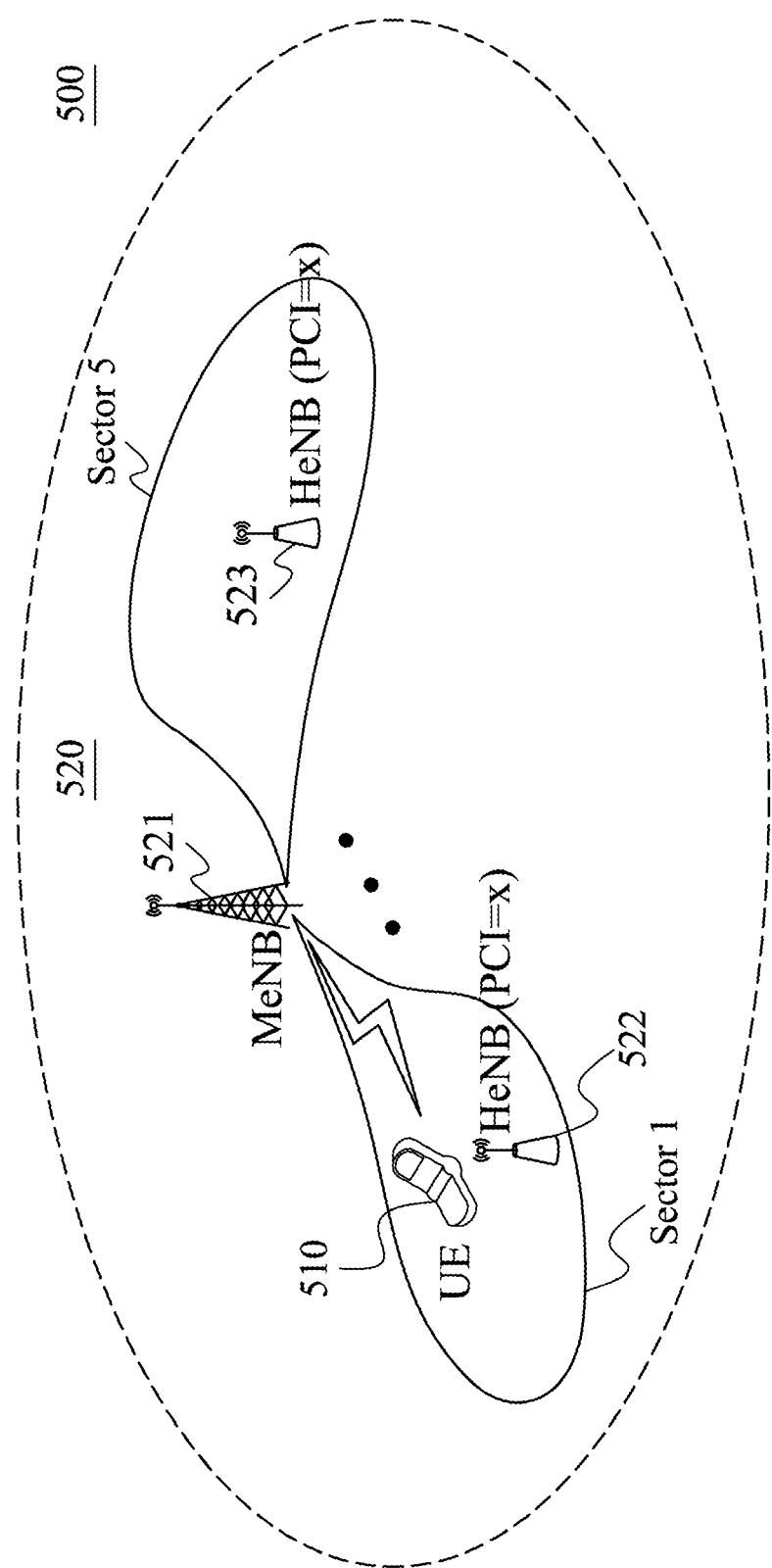
FIG. 5 is a block diagram illustrating another wireless communications system according to a network assisted embodiment of the invention.

FIG. 5 is a block diagram illustrating another wireless communications system according to a network assisted embodiment of the invention. Similar to FIG. 2, in the wireless communications system 500, the network 520 comprises an MeNB 521 and two HeNBs 522 and 523 having the same PCI, and an UE 510 is initially connected to an network 520 via the MeNB 521. However, in this embodiment, it is the MeNB 521 and the HeNBs 522 and 523 in charge of resolving the PCI confusion during inbound handovers. To be more specific, when first installed in the wireless communications system 500, the HeNBs 522 and 523 searches for the nearest MeNB, i.e. the MeNB 521, and transmits a respective wireless signal in the operation frequency of the searched MeNB before being activated to provide wireless services to the UE 510. In one embodiment, the wireless signal may be transmitted in a sounding channel, such as a random access channel (RACH), or in a channel specifically reserved on the radio resources which may be informed by the MeNB 521 via the backhaul connection. When receiving the wireless signals from the HeNBs 522 and 523, the MeNB 521 determines the arrival angles or antenna sectors of the wireless signals. Later, the MeNB 521 requests the UE 510 to measure the PCIs and signal strengths of the nearby network nodes after the UE 510 camps on the MeNB 521. When receiving the measurement report from the UE 510, the MeNB 521 further determines the arrival angle or antenna sector of the measurement report. According to the arrival angles or antenna sectors of the measurement report and the wireless signals, the MeNB 521 may distinguish between the HeNB 522 and the HeNB 523 according to the comparisons between the arrival angles or antenna sectors of the measurement report and the wireless signals, and determine that the HeNBs 522 is the target HeNB, since the arrival angles or antenna sectors of the measurement report and the wireless signal from the HeNB 522 are much more similar than those of the measurement report and the wireless signal from the HeNB 523. In addition, the target HeNB is determined further according to the detected signal strengths in the measurement report. Accordingly, the MeNB 521 transfers the control statuses and data for the UE 510 to the HeNB 522, and transmits an RRC reconfiguration message to hand over the UE 510 to the HeNB 522. Note that the MeNB 521 and the HeNBs 522 and 523 may respectively comprise a wireless module (not shown) for performing functionality of wireless transmissions and receptions, and a controller module (not shown) for controlling the operation of the wireless module as described above and other function components. It is to be understood that the UE 510 and the network 520 are given as an example, and the invention is not limited thereto. The invention may also be applied to wireless communications devices and service networks which are in compliance with other wireless technologies, such as the UTRAN, the EUTRAN, and the WiMAX radio access network, etc.

Figure 6:
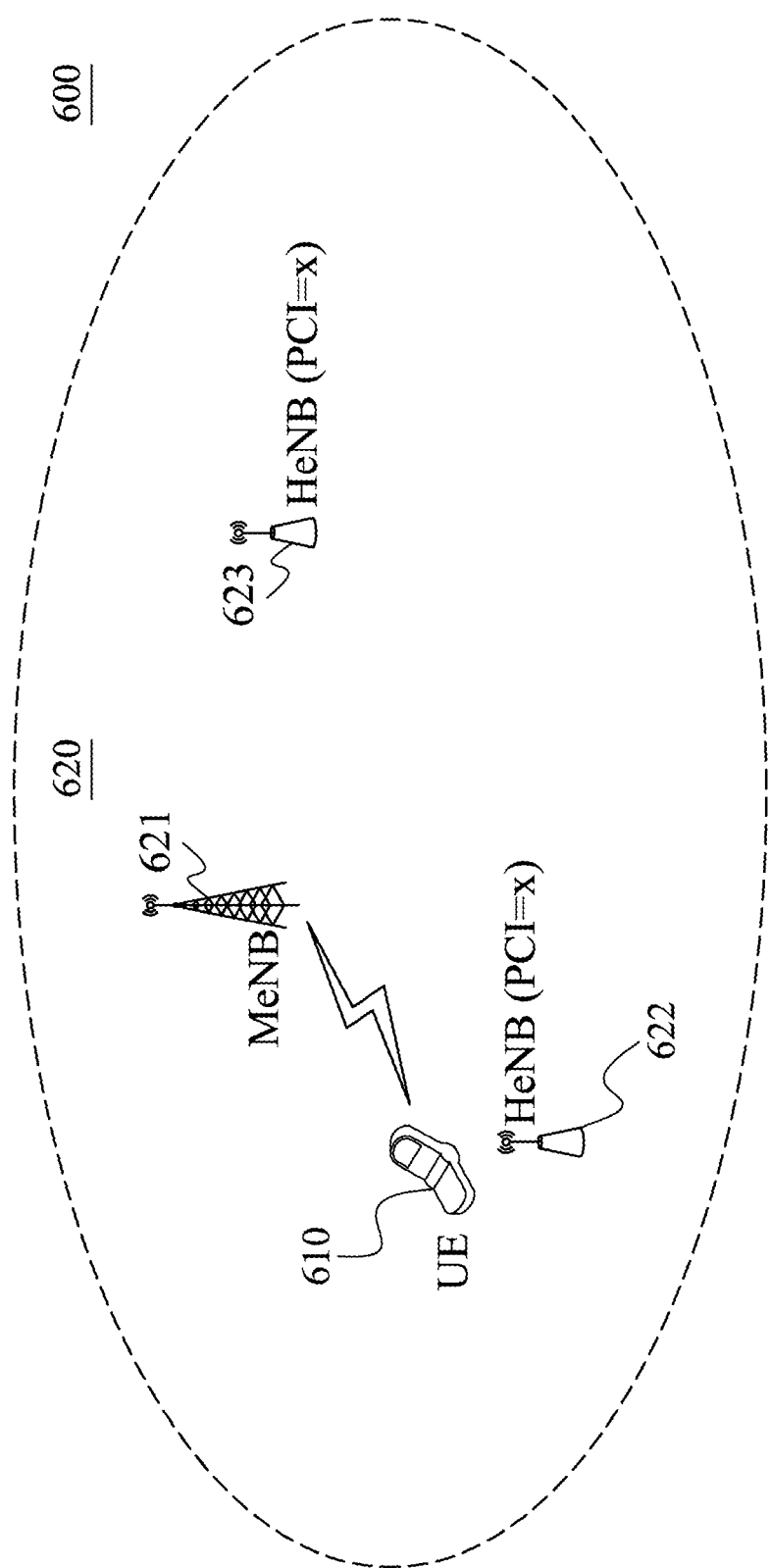
FIG. 6 is a block diagram illustrating another wireless communications system according to another network assisted embodiment of the invention.

FIG. 6 is a block diagram illustrating another wireless communications system according to another network assisted embodiment of the invention. Similar to FIG. 5, in the wireless communications system 600, the network 620 comprises an MeNB 621 and two HeNBs 622 and 623 having the same PCI, and an UE 610 is initially connected to an network 620 via the MeNB 621. However, in this embodiment, it is assumed that the HeNBs 622 and 623 having the same PCI are located far enough apart to avoid interferences caused to each other, so that the MeNB 621 may proactively request the HeNBs 622 and 623 to measure and report the signal strengths from the UE 610, prior to handovers, and use the reported signal strengths to resolve PCI confusion between the HeNBs 622 and 623. This assumption is reasonable because having the HeNBs with the same PCI located close to each other would cause the UE 610 to not be able to synchronize with the serving HeNB due to the strong interference caused by another HeNB with the same PCI. Specifically, the MeNB 621 may indicate the radio resource allocations of the uplink transmissions of the UE 610 to the HeNBs 622 and 623, so that the HeNBs 622 and 623 may measure the signal strengths from the UE 610 on the indicated radio resources. The indicated radio resources may be where the UE 610 is transmitting the uplink normal or real-time data, scheduling request, channel quality feedback, measurement report, sounding reference signal, demodulation reference signal, or other control or data transmissions in the uplink direction. The signal strengths from the UE 610 to be measured may be the envelop-detected power on the indicated radio resources, or the correlated power of a specific constant amplitude zero auto-correlation code (CAZAC) from the UE 610. In one embodiment, the MeNB 621 may additionally requests the UE 610 to transmit wireless signals to the HeNBs 622 and 623 to assist on the measurements of the signal strengths from the UE 610. Although not shown, it is to be understood that the MeNB 621 and the HeNBs 622 and 623 may each comprise a wireless module for performing the functionality of wireless transmissions and receptions, and a controller module for handling the determinations and controls related to the network assisted method for inbound handover enhancement.

Figure 7A:
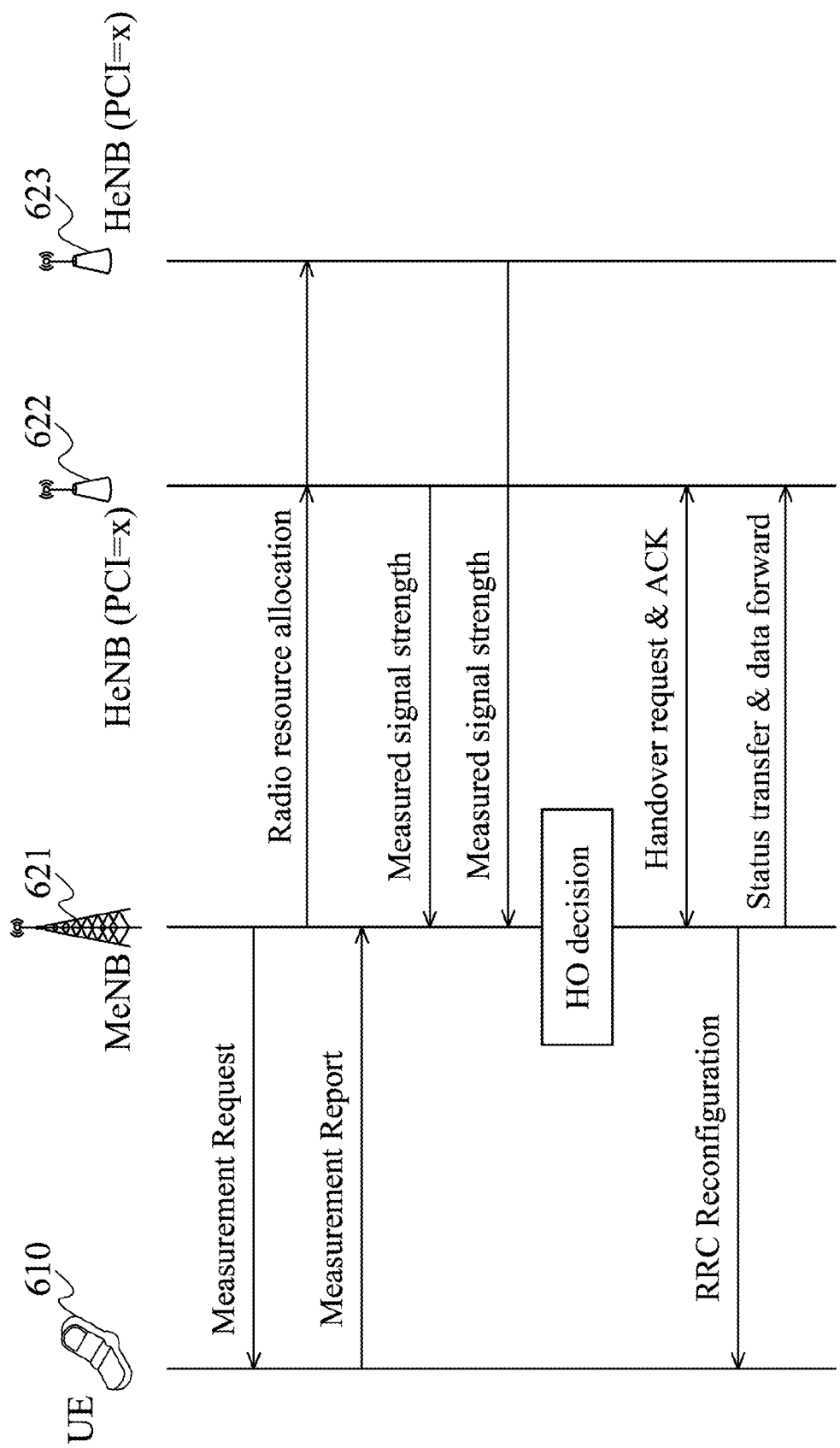
FIGS. 7A and 7B are message sequence charts illustrating operation alternatives of the wireless communications system in FIG. 5.
Figure 7B:
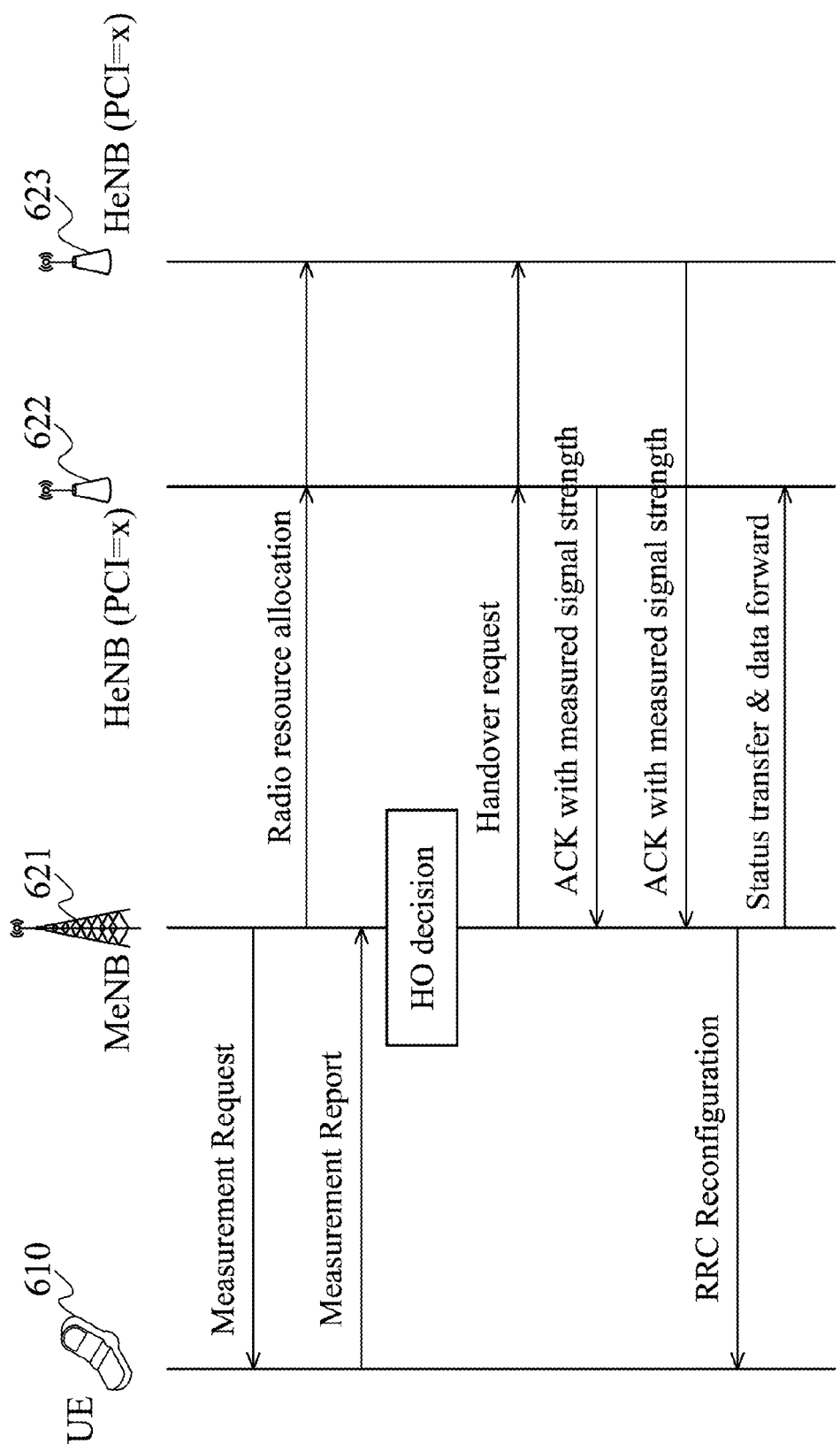

In one embodiment, the HeNBs 622 and 623 may report the measured signal strengths to the MeNB 621 as soon as the measurements are completed, as shown in FIG. 7A. If a requested HeNB can not measure any signal from the UE 610 for a predetermined period of time, it may reply with a negative acknowledgement (NACK) to the MeNB 621. Alternatively, if no signal from the UE 610 is measured, the requested HeNB may choose to reply with nothing to the MeNB 621, and the MeNB 621 may exclude the requested HeNB from the handover decision (denoted as HO decision) if no reply is received from it for the predetermined period of time. Later, the MeNB 621 makes a HO decision to determine that the HeNB 622 is the target HeNB for the UE 610 to be handed over to. Subsequently, a handover request is transmitted to and acknowledged by the HeNB 622. After that, the MeNB 621 transmits an RRC reconfiguration message with the information of the HeNB 622 to enable the inbound handover, and then transfers the control statuses and data for the UE 610 to the HeNB 622. In another embodiment, the HeNBs 622 and 623 may postpone the reporting of the measured signal strengths until a handover request is received from the MeNB 621, as shown in FIG. 7B. That is, the HeNBs 622 and 623 may take time to measure the signal strengths from the UE 610, and the MeNB 621 may transmit a handover request to the HeNBs 622 and 623 upon making the HO decision. When receiving the handover request, the HeNBs 622 and 623 may reply with an ACK including the measured signal strengths to the MeNB 621, so that the MeNB 621 may determine the target HeNB according to the measured signal strengths. If no signal from the UE 610 is measured, the requested HeNB may reply with a NACK or nothing to the MeNB 621. For the case where the requested HeNB replies with nothing to the MeNB 621 as no signal is measured from the UE 610, the MeNB 621 may exclude the non-replied HeNB from the HO decision if no reply is received from it in a predetermined period of time. After the HO decision is made, the MeNB 621 transmits an RRC reconfiguration message with the information of the HeNB 622 to enable the inbound handover, and then transfers the control statuses and data for the UE 610 to the HeNB 622.

Figure 8:
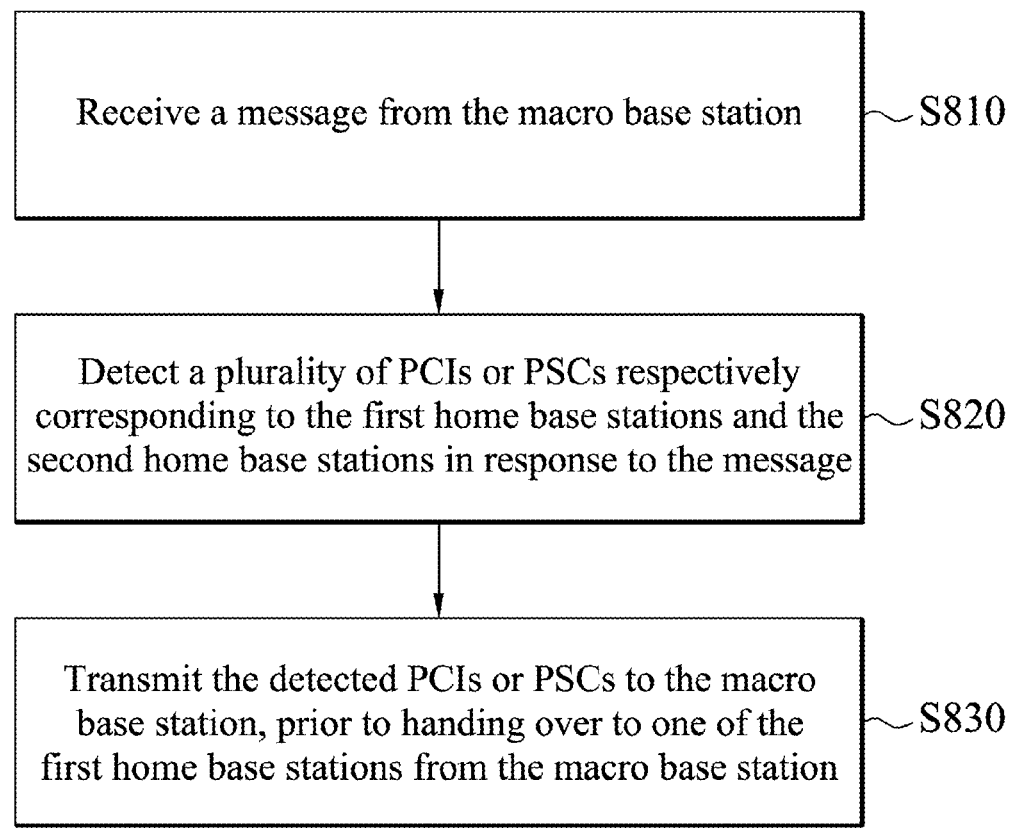
FIG. 8 is a flow chart illustrating a method for resolving PCI confusion during an inbound handover according to the UE assisted embodiment in FIG. 2.

FIG. 8 is a flow chart illustrating a method for resolving PCI confusion during an inbound handover according to the UE assisted embodiment in FIG. 2. The UE 210 is initially connected to the network 220 via the MeNB 221 for obtaining wireless services, and the network 220 further comprises two HeNBs 222 and 223 having the same PCI, and a plurality of neighboring HeNBs of the HeNBs 222 and 223. Note that although the HeNBs 222 and 223 have the same PCI, the neighboring HeNBs of the HeNB 222 and the HeNBs of the HeNB 223 are assigned with PCIs that are not completely identical. To begin, the UE 210 receives a message from the MeNB 221 (step S810). The message may be a measurement request or a measurement configuration message, to trigger the measurements on specific neighboring network nodes. In response to the message, the UE 210 detects a plurality of PCIs respectively corresponding to the HeNBs 222 and 223 and their neighboring HeNBs (step S820). In addition to the PCIs, the UE 210 may further detect the signal strengths from the HeNBs 222 and 223 and their neighboring HeNBs during the measurement. Subsequently, when the measurement is completed, the UE 210 transmits the detected PCIs to the MeNB 221, prior to being handed over to one of the HeNBs 222 and 223 from the MeNB 221 (step S830). The MeNB 221 may determine that the HeNB 222 is the target HeNB for the inbound handover. After a handover request is transmitted to and acknowledged by the HeNB 222, the MeNB 221 transmits an RRC reconfiguration message with information of the HeNB 222 to enable the inbound handover, and then transfers the control statuses and data for the UE 210 to the HeNB 222. In one embodiment, the UE 210 may further sort the detected PCIs in an incremental or a decremental order according to the detected signal strengths of the HeNBs 222 and 223 and their neighboring HeNBs, before reporting to the MeNB 221.

It is noted that the measurement process described above may be carried out differently. In one embodiment, when the measurement request or measurement configuration message is received, the UE 210 performs measurement to detect the PCI and signal strength from the HeNB 222 and report the measurement result to the MeNB 221. The MeNB 221 determines that a PCI confusion is occurred for the HeNBs 222 and 223 both having the PCI of 5, and further transmits another measurement request indicating that measurements on the neighboring HeNBs of the HeNBs 222 and 223 are requested, wherein the neighboring HeNBs of the HeNB 222 are not supposed to overlap with the neighboring HeNBs of the HeNB 223. Alternatively, the later measurement request may indicate that measurements on the neighboring HeNBs of either one of HeNBs 222 and 223 are requested. In response to the later measurement request, the UE 210 performs measurement to detect the PCIs and signal strengths from the neighboring HeNBs of the HeNBs 222 and 223, and transmits another measurement report with the detected signal strengths and PCIs of the measured HeNB to the MeNB 221 when the measurements are completed. Based on the later received measurement report, the MeNB 221 determines that the HeNB 222 may be the target HeNB as the detected signal strengths from the neighboring HeNBs of the HeNB 222 are stronger than that from the neighboring HeNBs of the HeNB 223 in the measurement report. In another embodiment, when the measurement request is received, the UE 210 performs measurement to detect the PCI and signal strength from the HeNB 222 and report the measurement result to the MeNB 221. The MeNB determines that a PCI confusion is occurred for the HeNBs 222 and 223 both having the PCI of 5, and further indicates to the UE 210 that a PCI confusion is occurred with respect to the most recently received measurement report. The indication of PCI confusion may be an RRC message or a MAC layer indicator with information of the PCI confusion. In response to the indication, the UE 210 autonomously performs measurements on any possible neighboring HeNBs of the HeNB 222, and transmits another measurement report with the detected signal strengths and PCIs of the measured HeNB to the MeNB 221 when the measurements are completed. Based on the later received measurement report, the MeNB 221 determines that the HeNB 222 may be the target HeNB according to the knowledge of the deployments of the neighboring network nodes of the HeNBs 222 and 223.

Figure 9:
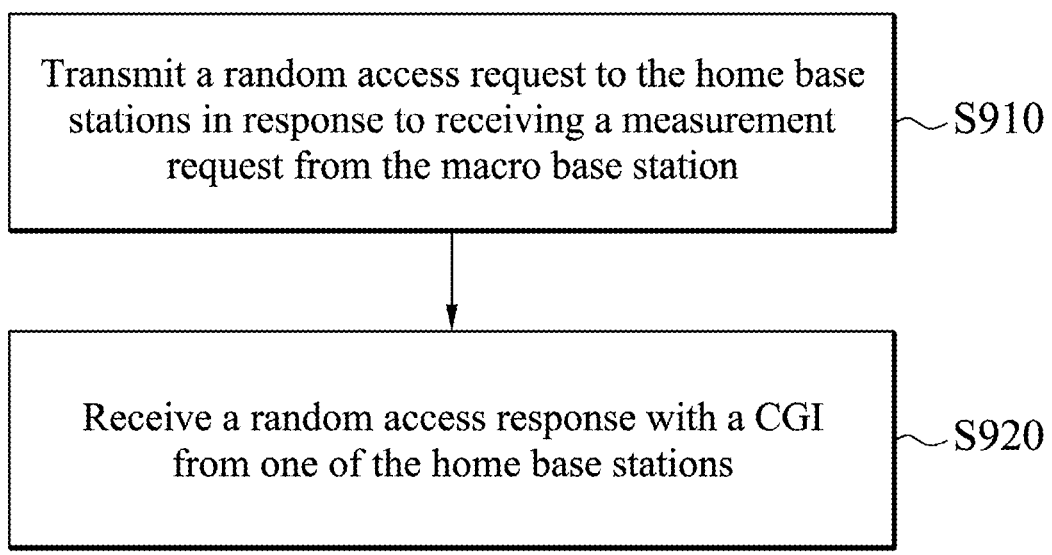
FIG. 9 is a flow chart illustrating a method for resolving PCI confusion during an inbound handover according to the UE assisted embodiment in FIG. 3.

FIG. 9 is a flow chart illustrating a method for resolving PCI confusion during an inbound handover according to the UE assisted embodiment in FIG. 4. As described in FIG. 4, the UE 410 is initially connected to the network 420 via the MeNB 421 for obtaining wireless services, and the network 420 further comprises two HeNBs 422 and 423 having the same PCI. Note that a specific random access preamble and a corresponding PRACH configuration is reserved for the random access procedures later performed between the UE 410 and the HeNBs 422 and 423. To begin, the UE 410 transmits a random access request to the HeNBs 422 and 423 in response to receiving a measurement request from the MeNB 421 (step S910). In another embodiment, the MeNB 421 may transmit a measurement configuration message, instead of the measurement request, to the UE 410 to trigger the measurements on specific neighboring network nodes. Note that the HeNBs 422 and 423 are located far enough apart to avoid interferences caused to each other, so that the HeNB 423 does not receive the random access request from the UE 410. When receiving the random access request, the HeNB 422 replies with a random access response with its CGI to the UE 410 (step S920). Since the CGI can be used to uniquely identify a network node in a service network, the UE 410 may use the CGI to indicate the measured HeNBs in the measurement report. Specifically, the UE 410 may transmit a measurement report with the CGI to the MeNB 421, prior to being handed over to the one of the HeNB 422 from the MeNB 421, so that the MeNB 421 may determine that the HeNB 422 is the target HeNB for the UE 410 to be handed over to according to the CGI. In the measurement report, the UE 410 may also include the detected signal strength of the random access response. To further clarify, after a handover request is transmitted to and acknowledged by the HeNB 422, the MeNB 421 further transmits an RRC reconfiguration message with information of the HeNB 422 to enable the inbound handover, and then transfers the control statuses and data for the UE 410 to the HeNB 422. In one embodiment, the HeNB 422 may further include a closed subscriber group identity (CSG ID) in the random access response, and the MeNB 421 may determine the target HeNB further according to the CSG ID.

Figure 10:
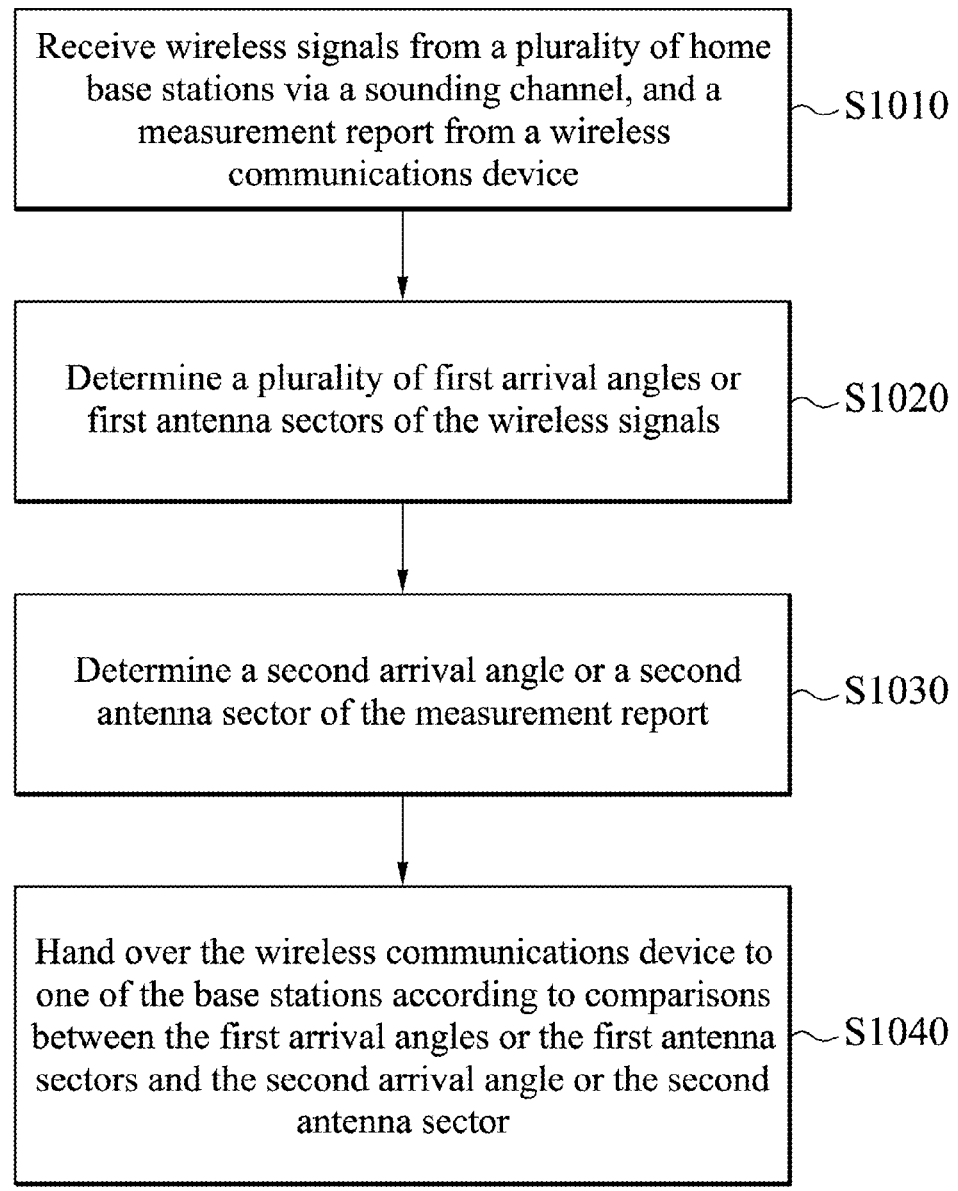
FIG. 10 is a flow chart illustrating a method for resolving PCI confusion during an inbound handover according to the network assisted embodiment in FIG. 4.

FIG. 10 is a flow chart illustrating a method for resolving PCI confusion during an inbound handover according to the network assisted embodiment in FIG. 5. As described in FIG. 5, the UE 510 is initially connected to the network 520 via the MeNB 521 for obtaining wireless services, and the network 520 further comprises two HeNBs 522 and 523 having the same PCI. Note that the HeNBs 522 and 523 are located far enough apart to avoid interferences caused to each other. To begin, the MeNB 521 receives wireless signals from the HeNBs 522 and 523 via a sounding channel (step S1010). Generally, when first installed in the network 520, the HeNBs 522 and 523 may search the operation frequency of the MeNB 521 if the network 520 operates in an inter-frequency scenario, and transmit the wireless signal in the searched operation frequency. The sounding channel may be a RACH channel, or a channel specifically reserved on the radio resources which may be informed by the MeNB 521 via the backhaul connection. Then, the MeNB 521 determines the arrival angles or antenna sectors of the wireless signals (step S1020). Later, when receiving a measurement report from the UE 510, the MeNB 521 further determines the arrival angles or antenna sectors of the measurement report (step S1030). Based on the arrival angles or the antenna sectors of the wireless signals and the measurement report, the MeNB 521 accordingly determines the target HeNB among the HeNBs 522 and 523 and hands over the UE 510 to the target HeNB (step S1040).

Figure 11:
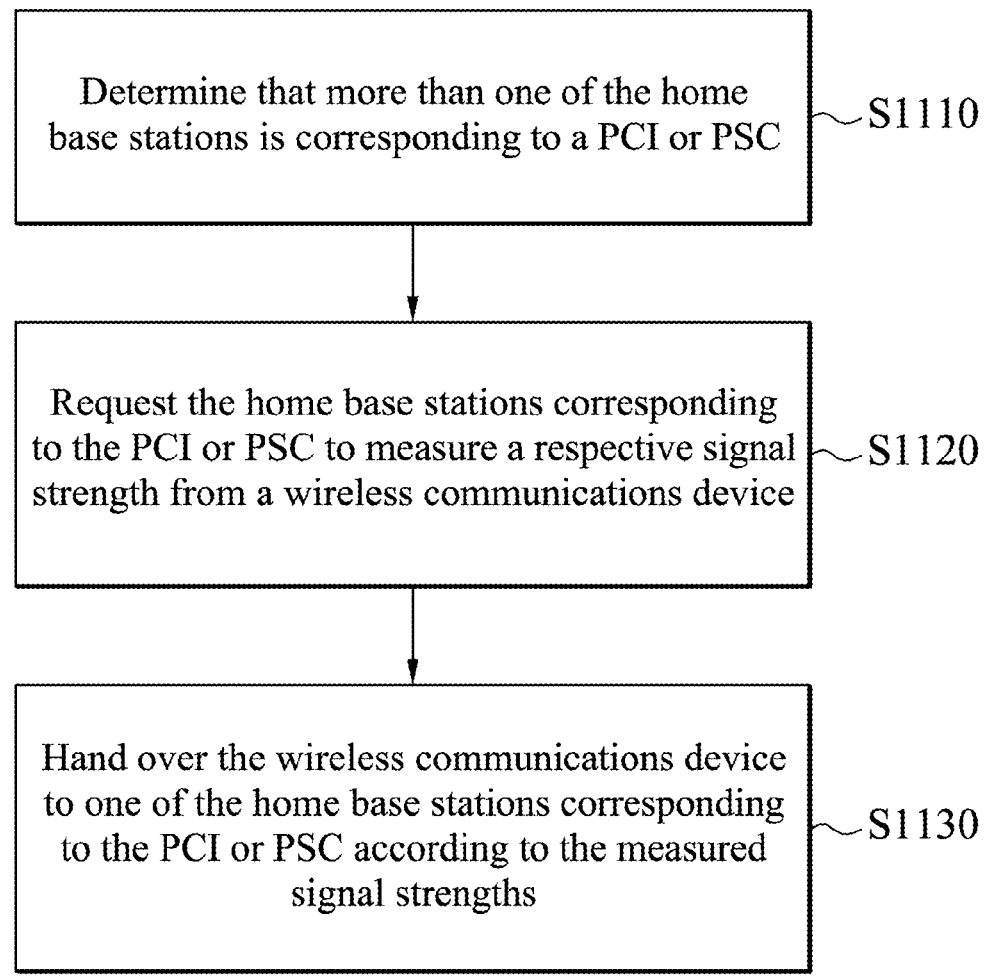
FIG. 11 is a flow chart illustrating a method for resolving PCI confusion during an inbound handover by a macro base station according to the network assisted embodiment in FIG. 5.

FIG. 11 is a flow chart illustrating a method for resolving PCI confusion during an inbound handover by a macro base station according to the network assisted embodiment in FIG. 6. As described in FIG. 6, the UE 610 is initially connected to the network 620 via the MeNB 621 for obtaining wireless services, and the network 620 further comprises two HeNBs 622 and 623 having the same PCI. Note that the HeNBs 622 and 623 are located far enough apart to avoid interferences caused to each other. To begin, the MeNB 621 determines that both of the HeNBs 622 and 623 have a PCI of 5 (step S1110), and this results in PCI confusion. In order to resolve PCI confusion between the HeNBs 622 and 623, the MeNB 621 proactively requests the HeNBs 622 and 623 to measure the wireless signals from the UE 610 (step S1120). Specifically, the MeNB 621 may indicate the radio resource allocations of the uplink transmissions of the UE 610 to the HeNBs 622 and 623, so that the HeNBs 622 and 623 may measure the wireless signals from the UE 610 on the indicated radio resources. The indicated radio resources may be where the UE 610 transmits the uplink normal or real-time data, scheduling request, channel quality feedback, measurement report, sounding reference signal, demodulation reference signal, or other control or data transmissions in the uplink direction. The wireless signals from the UE 610 to be measured may be the envelop-detected power on the indicated radio resources, or the correlated power of specific CAZAC from the UE 610. In response to the request from the MeNB 621, the HeNBs 622 and 623 may report the measured wireless signals to the MeNB 621 as soon as the measurements are completed, as shown in FIG. 7A, or alternatively, the HeNBs 622 and 623 may postpone the reporting of the measured signal strengths until a handover request is received from the MeNB 621, as shown in FIG. 7B. Regarding the detailed operations of the reporting of the measured wireless signals, references may be made to the related descriptions of FIGS. 7A and 7B. Based on the measured wireless signals, the MeNB 621 hands over the UE 610 to one of the HeNBs 622 and 623 (step S1130). To be more specific in step S1130, the MeNB 621 first determines that the HeNB 622 is the target HeNB for the inbound handover since the HeNB 622 measured a wireless signal with stronger signal strength from the UE 610. After a handover request is transmitted to and acknowledged by the HeNB 622, the MeNB 621 transmits an RRC reconfiguration message with the information of the HeNB 622 to enable the inbound handover, and then transfers the control statuses and data for the UE 610 to the HeNB 622. Thus, the target HeNB is unambiguously determined and the inbound handover is successfully completed.

Figure 12:
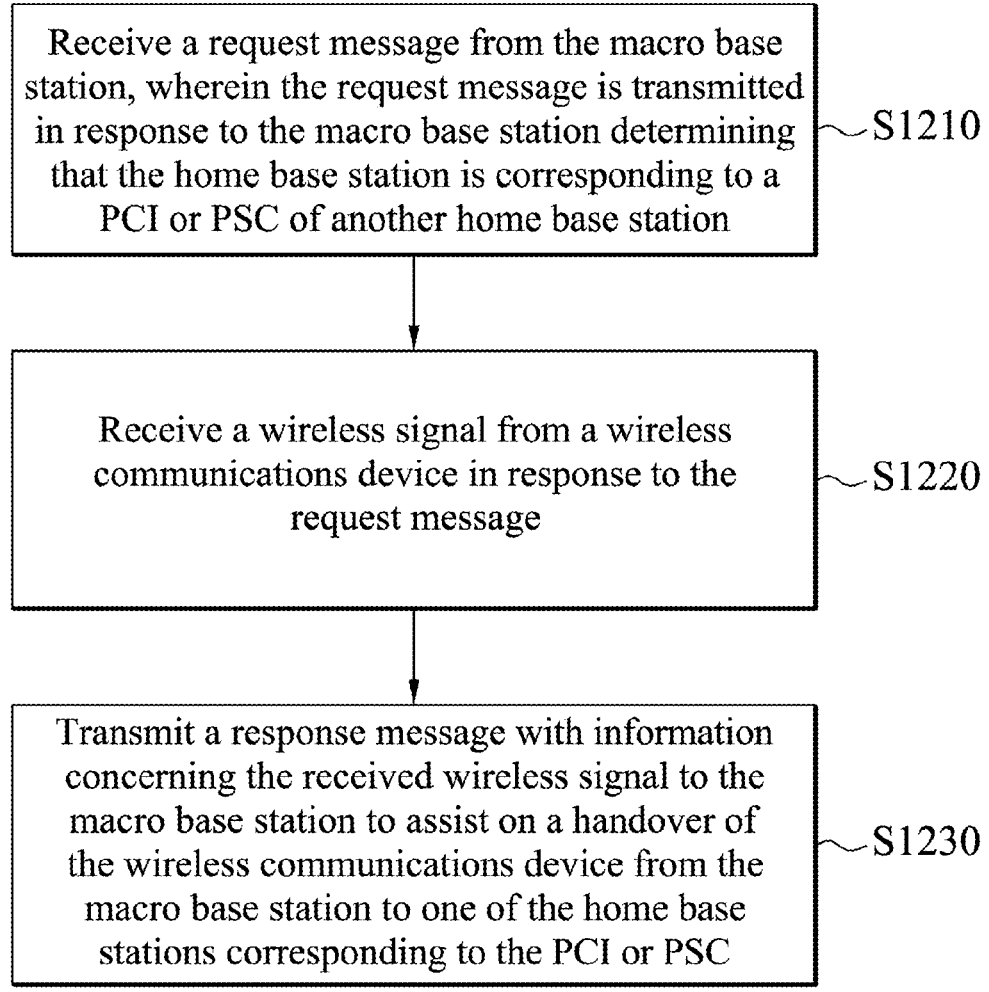
FIG. 12 is a flow chart illustrating a method for resolving PCI confusion during an inbound handover by a home base station according to the network assisted embodiment in FIG. 6.

FIG. 12 is a flow chart illustrating a method for resolving PCI confusion during an inbound handover by a home base station according to the network assisted embodiment in FIG. 6. As described in FIG. 6, the UE 610 is initially connected to the network 620 via the MeNB 621 for obtaining wireless services, and the network 620 further comprises two HeNBs 622 and 623 having the same PCI. Note that the HeNBs 622 and 623 are located far enough apart to avoid interferences caused to each other. To begin, each of the HeNBs 622 and 623 receives a request message from the MeNB 621 (step S1210). Particularly, the request message is transmitted in response to the MeNB 621 determining that the HeNBs 622 and 623 are both corresponding to the same PCI or PSC. In response to the request message, each of the HeNBs 622 and 623 receives a wireless signal from the UE 610 for measuring the signal strength from the UE 610 (step S1220). After completing of the measurement of the signal strength from the UE 610, the HeNBs 622 and 623 may each transmit a response message with the measured signal strength to the MeNB 621 to assist on the handover of the UE 610 from the MeNB 621 to one of the HeNBs 622 and 623 (step 1230). The response message may be transmitted upon completion of the measurement of the signal strength from the UE 610; or alternatively, each of the HeNBs 622 and 623 may just keep the measured result upon completing the measurement, and only transmit the response message when receiving an inquiry message from the MeNB 621. To be more specific, the MeNB 621 determines that the HeNB 622 is the target HeNB for the inbound handover since the HeNB 622 measured a wireless signal with stronger signal strength from the UE 610. After a handover request is transmitted to and acknowledged by the HeNB 622, the MeNB 621 transmits an RRC reconfiguration message with the information of the HeNB 622 to enable the inbound handover, and then transfers the control statuses and data for the UE 610 to the HeNB 622.

It is to be understood that the PCI confusion is generally referred to as confusion of cell identifications, and other naming of the cell identifications may be used in different wireless communications networks. For example, physical scrambling codes (PSCs) instead of PCIs are used for cell identifications in a UTRAN, EUTRAN, WiMAX radio access network etc., and the confusion of cell identifications may be referred to as PSC confusion. Thus, the invention is not limited to using PCI as cell identifications.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A wireless communications device for inbound handover enhancement, comprising:
 a wireless module, performing wireless transmission and reception to and from a service network comprising at least two first home base stations having the same physical cell identities (PCI) or physical scrambling codes (PSC), a plurality of second home base stations neighboring the first home base stations, and a macro base station,
 wherein the second home base stations neighboring one of the first home base stations and the second home base stations neighboring another one of the first home base stations are assigned with non-identical PCIs or PSCs; and
 a controller module, receiving a message from the macro base station via the wireless module, requesting the wireless module to detect a plurality of PCIs or PSCs respectively corresponding to the first home base stations and the second home base stations in response to the message, transmitting the detected PCIs or PSCs to the macro base station via the wireless module, prior to being handed over to the one of the first home base stations from the macro base station.

2. The wireless communications device of claim 1, wherein the message is a measurement request indicating measurements on the first home base stations and the second home base stations are requested.

3. The wireless communications device of claim 1, wherein the message is an indication of an occurrence of PCI or PSC confusion between the first home base stations.

4. The wireless communications device of claim 1, wherein the macro base station determines the one of the first home base stations according to the received PCIs or PSCs, and transmits a reconfiguration message to hand over the wireless communications device to the one of the first home base stations.

5. The wireless communications device of claim 1, wherein, prior to transmitting the detected PCIs or PSCs to the service network, the controller module further detects a plurality of signal strengths of the first home base stations and the second home base stations, and sorts the detected PCIs or PSCs in an incremental or a decremental order according to the detected signal strengths.

6. A method for inbound handover enhancement executed in a wireless communications device connecting to a service network comprising at least two first home base stations having the same physical cell identities (PCI) or physical scrambling codes (PSC), a plurality of second home base stations neighboring the first home base stations, and a macro base station, the method comprising:
 receiving a message from the macro base station;
 detecting a plurality of PCIs or PSCs respectively corresponding to the first home base stations and the second home base stations in response to the message,
 wherein the second home base stations neighboring one of the first home base stations and the second home base stations neighboring another one of the first home base stations are assigned with non-identical PCIs or PSCs; and transmitting the detected PCIs or PSCs to the macro base station, prior to being handed over to one of the first home base stations from the macro base station.

7. The method of claim 6, wherein the message is a measurement request indicating measurements on the first home base stations and the second home base stations are requested.

8. The method of claim 6, wherein the message is an indication of an occurrence of PCI or PSC confusion between the first home base stations.

9. The method of claim 6, wherein the macro base station determines the one of the first home base stations according to the received PCIs or PSCs, and transmits a reconfiguration message to hand over the wireless communications device to the one of the first home base stations.

10. The method of claim 6, further comprising, prior to transmitting the detected PCIs or PSCs to the macro base station, detecting a plurality of signal strengths of the first home base stations and the second home base stations, and sorting the detected PCIs or PSCs in an incremental or a decremental order according to the detected signal strengths.

11. A macro base station for inbound handover enhancement, comprising:
a wireless module, receiving wireless signals from a plurality of home base stations via a sounding channel and a measurement report from a wireless communications device; and
a controller module, determining a plurality of first arrival angles or first antenna sectors of the wireless signals, determining a second arrival angle or a second antenna sector of the measurement report, and handing over the wireless communications device to one of the base stations according to comparisons between the first arrival angles or the first antenna sectors and the second arrival angle or the second antenna sector.

12. The macro base station of claim 11, wherein each of the home base stations further searches an operation frequency of the macro base station, and the wireless signals are transmitted in the operation frequency.

13. The macro base station of claim 11, wherein the wireless signals are transmitted via the sounding channel when the home base stations are first installed in a coverage of the macro base station.

14. The macro base station of claim 11, wherein the handing over of the wireless communications device is performed further according to the measurement report.

15. The macro base station of claim 11, wherein the sounding channel is a random access channel.

16. A method for inbound handover enhancement executed in a macro base station, comprising:
receiving wireless signals from a plurality of home base stations via a sounding channel, and a measurement report from a wireless communications device;
determining a plurality of first arrival angles or first antenna sectors of the wireless signals;
determining a second arrival angle or a second antenna sector of the measurement report; and
handing over the wireless communications device to one of the home base stations according to comparisons between the first arrival angles or the first antenna sectors and the second arrival angle or the second antenna sector.

17. The method of claim 16, wherein the home base stations search an operation frequency of the macro base station, and the wireless signals are transmitted in the operation frequency.

18. The method of claim 16, wherein the wireless signals are transmitted via the sounding channel when the home base stations are first installed in a coverage of the macro base station.

19. The method of claim 16, wherein the handing over of the wireless communications device is performed further according to the measurement report.

20. The method of claim 16, wherein the sounding channel is a random access channel.

21. A macro base station for inbound handover enhancement, comprising:
a wireless module, performing wireless transmissions and receptions from and to a plurality of home base stations and a wireless communications device; and
a controller module, determining more than one of the home base stations is corresponding to a physical cell identity (PCI) or physical scrambling code (PSC), requesting the wireless communications device to transmit wireless signals to the home base stations corresponding to the PCI or PSC, requesting the home base stations corresponding to the PCI or PSC to measure the wireless signals from the wireless communications device, and handing over the wireless communications device to one of the home base stations corresponding to the PCI or PSC according to the measured wireless signals.

22. The macro base station of claim 21, wherein the handing over step further comprises transmitting a reconfiguration message to the wireless communications device indicating configuration of the one of the home base stations, and transferring control statuses and data for the wireless communications device to the one of the home base stations.

23. The macro base station of claim 21, wherein the requested home base stations reports information concerning the measured wireless signals to the macro base station, prior to the handing over of the wireless communications device.

24. The macro base station of claim 21, wherein the macro base station further inquires the requested home base stations about the measured wireless signals, prior to handing over the wireless communications device.

25. A method for inbound handover enhancement executed in a macro base station with a coverage over a plurality of home base stations, the method comprising:
determining that more than one of the home base stations is corresponding to a physical cell identity (PCI) or physical scrambling code (PSC);
requesting the wireless communications device to transmit wireless signals to the home base stations corresponding to the PCI or PSC;
requesting the home base stations corresponding to the PCI or PSC to measure the wireless signals from a wireless communications device; and
handing over the wireless communications device to one of the home base stations corresponding to the PCI or PSC according to the measured wireless signals.

26. The method of claim 25, wherein the handing over step further comprises transmitting a reconfiguration message to the wireless communications device indicating configuration of the one of the home base stations, and transferring control statuses and data for the wireless communications device to the one of the home base stations.

27. The method of claim 25, wherein the requested home base stations reports information concerning the measured wireless signals to the macro base station, prior to the handing over of the wireless communications device.

28. The method of claim 25, further comprising inquiring the requested home base stations about the measured wireless signals, prior to handing over the wireless communications device.

29. A home base station for inbound handover enhancement, comprising:
a wireless module, receiving a request message from a macro base station, wherein the request message is transmitted in response to the macro base station determining that the home base station is corresponding to a physical cell identity (PCI) or physical scrambling code (PSC) of another home base station; and
a controller module, requesting the wireless module to receive a wireless signal from a wireless communications device in response to the request message, and transmitting a response message with information concerning the received wireless signal to the macro base station to assist on a handover of the wireless communications device from the macro base station to one of the home base stations corresponding to the PCI or PSC,
wherein the wireless signal is transmitted by the wireless communications device in response to being requested by the macro base station.

30. The home base station of claim 29, wherein the response message is transmitted upon completion of the receiving of the wireless signal from the wireless communications device.

31. The home base station of claim 29, wherein the response message is transmitted in response to an inquiry message from the macro base station.

32. A method for inbound handover enhancement executed in a home base station corresponding to a physical cell identity (PCI) or physical scrambling code (PSC) of another home base station in a coverage of a macro base station, the method comprising:
receiving a request message from the macro base station, wherein the request message is transmitted in response to the macro base station determining that the home base station is corresponding to a physical cell identity (PCI) or physical scrambling code (PSC) of another home base station;
receiving a wireless signal from a wireless communications device in response to the request message, wherein the wireless signal is transmitted by the wireless communications device in response to being requested by the macro base station; and
transmitting a response message with information concerning the received wireless signal to the macro base station to assist on a handover of the wireless communications device from the macro base station to one of the home base stations corresponding to the PCI or PSC.

33. The method of claim 32, wherein the response message is transmitted upon completion of the receiving of the wireless signal from the wireless communications device.

34. The method of claim 32, wherein the response message is transmitted in response to an inquiry message from the macro base station.

35. A wireless communications device for inbound handover enhancement, comprising:
a wireless module, performing wireless transmission and reception to and from a service network comprising a macro base station and at least two home base stations corresponding to a physical cell identities (PCI) or physical scrambling codes (PSC); and
a controller module, transmitting a random access request to the home base stations via the wireless module in response to receiving a measurement request from the macro base station, and receiving a random access response with a cell global identity (CGI) from one of the home base stations.

36. The wireless communications device of claim 35, wherein the controller module further transmits a measurement report with the CGI to the macro base station via the wireless module, prior to the wireless communications device being handed over to the one of the home base stations from the macro base station.

37. The wireless communications device of claim 36, wherein the macro base station determines the one of the home base stations according to the CGI, and transmits a reconfiguration message to hand over the wireless communications device to the one of the home base stations.

38. The wireless communications device of claim 35, wherein the macro base station reserves a random access preamble and a physical random access channel (PRACH) configuration for the random access request and the random access response, and indicates the random access preamble and the PRACH configuration to the home base stations.

39. The wireless communications device of claim 38, wherein the controller module further requests the wireless module to detect signal strength of the random access response, and a measurement report is transmitted further with the detected signal strength.

40. The wireless communications device of claim 35, wherein the random access response further comprises a closed subscriber group identity (CSG ID), and the macro base station determines the one of the home base stations further according to the CSG ID.

41. A method for inbound handover enhancement executed in a wireless communications device connecting to a service network comprising a macro base station and at least two home base stations corresponding to a physical cell identities (PCI) or physical scrambling codes (PSC), the method comprising
transmitting a random access request to the home base stations in response to receiving a measurement request from the macro base station; and
receiving a random access response with a cell global identity (CGI) from one of the home base stations.

42. The method of claim 41, further comprising transmitting a measurement report with the CGI to the macro base station, prior to being handed over to the one of the home base stations from the macro base station.

43. The method of claim 42, wherein the macro base station determines the one of the home base stations according to the CGI, and transmits a reconfiguration message to hand over the wireless communications device to the one of the home base stations.

44. The method of claim 41, wherein the macro base station reserves a random access preamble and a physical random access channel (PRACH) configuration for the random access request and the random access response, and indicates the random access preamble and the PRACH configuration to the home base stations.

45. The method of claim 44, further comprising detecting signal strength of the random access response, wherein a measurement report is transmitted further with the detected signal strength.

46. The method of claim 41, wherein the random access response further comprises a closed subscriber group identity (CSG ID), and the macro base station determines the one of the home base stations further according to the CSG ID.

* * * * *